US006639904B1

United States Patent
Boyer et al.

(10) Patent No.: US 6,639,904 B1
(45) Date of Patent: Oct. 28, 2003

(54) METHOD AND SYSTEM FOR ADAPTING A CHANNEL ASSIGNMENT PLAN TO INCLUDE SHARED FREQUENCY CHANNELS

(75) Inventors: Pete A. Boyer, Somerville, MA (US); David F. Freeman, Billerica, MA (US); Alan B. Jennison, Zephyrhills, FL (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/461,534

(22) Filed: Dec. 15, 1999

(51) Int. Cl.[7] ................................................. H04Q 7/00
(52) U.S. Cl. ....................................... 370/329; 370/341
(58) Field of Search ................................. 370/341, 348, 370/329, 332, 333, 328, 330, 344, 343; 455/446, 448, 450, 452, 453, 62, 63, 671, 675

(56) References Cited

U.S. PATENT DOCUMENTS

| | | | | |
|---|---|---|---|---|
| 5,280,630 A | * | 1/1994 | Wang ........................ 455/56.1 |
| 5,448,621 A | | 9/1995 | Knudsen ...................... 379/58 |
| 5,483,666 A | | 1/1996 | Yamada et al. ............. 455/33.1 |
| 5,513,379 A | * | 4/1996 | Benveniste et al. ........ 455/33.1 |
| 5,574,466 A | | 11/1996 | Reed et al. ................. 342/359 |
| 5,603,085 A | | 2/1997 | Shedlo ....................... 455/33.1 |
| 5,666,655 A | | 9/1997 | Ishikawa et al. ............. 455/512 |
| 5,710,758 A | | 1/1998 | Soliman et al. ............. 370/241 |
| 5,722,043 A | * | 2/1998 | Rappaport et al. ......... 455/33.1 |
| 5,726,978 A | | 3/1998 | Frodigh et al. ............. 370/252 |
| 5,859,841 A | | 1/1999 | Gitlits ........................ 370/335 |
| 5,926,763 A | | 7/1999 | Greene, Sr. et al. ........ 455/450 |
| 5,956,643 A | * | 9/1999 | Benveniste .................. 455/452 |
| 5,963,867 A | | 10/1999 | Reynolds et al. ........... 455/457 |
| 6,175,739 B1 | * | 1/2001 | Ishii et al. .................. 455/452 |
| 6,219,554 B1 | * | 4/2001 | Eswara et al. .............. 455/452 |

* cited by examiner

Primary Examiner—William Trost
Assistant Examiner—N Mehrpour
(74) Attorney, Agent, or Firm—Leonard Charles Suchyta; James K. Weixel

(57) ABSTRACT

In a cellular communication network (20) having a channel assignment plan (28) that distinguishes frequency channels (34) assigned to a plurality of cells (24), a method (58) and system (46) adapt the channel assignment plan (28) during network planning to include shared frequency channels (45). Borrower cells (84) are identified in response to a deficiency value (36) indicating a shortage in a quantity of the frequency channels (34) assigned to the borrower cells (84). Donor cells (95) are selected from the cells (24) in response to a load factor (38) for each of the cells (24), the load factor (38) indicating the number of frequency channels (34) already being shared by the cell (24). Candidate frequency channels (34) that may be shared are evaluated against predetermined channel sharing constraints, such as frequency separation constraints (156, 158), co-channel carrier-to-interference C/I constraints (232, and adjacent channel C/I) constraints (280).

25 Claims, 13 Drawing Sheets

| CELL ID | LOCATION ID | ASSIGNED CHANNELS | DEFICIENCY | LOAD FACTOR | STATUS | SHARING CELL ID | IN USE BY |
|---|---|---|---|---|---|---|---|
| A | xyz-1 | | 0 | 0 | | | |
| | | 15 | | | AVAIL | | |
| | | 37 | | | AVAIL | | |
| | | 48 | | | AVAIL | | |
| | | 81 | | | AVAIL | | |
| | | 125 | | | AVAIL | | |
| | | 213 | | | AVAIL | | |
| B | xyz-2 | | 3 | 0 | | | |
| | | 10 | | | AVAIL | | |
| | | 31 | | | AVAIL | | |
| | | 52 | | | AVAIL | | |
| | | 77 | | | AVAIL | | |
| | | 89 | | | AVAIL | | |
| | | 102 | | | AVAIL | | |
| C | xyz-3 | | 0 | 0 | | | |
| | | 12 | | | AVAIL | | |
| | | 24 | | | AVAIL | | |
| | | 42 | | | AVAIL | | |
| D | xyz-4 | | 1 | 0 | | | |
| | | 4 | | | AVAIL | | |
| | | 29 | | | AVAIL | | |
| | | 35 | | | AVAIL | | |
| | | 56 | | | AVAIL | | |
| E | xyz-5 | | 0 | 0 | | | |
| | | 18 | | | AVAIL | | |
| | | 59 | | | AVAIL | | |
| F | xyz-6 | | 0 | 0 | | | |
| | | 9 | | | AVAIL | | |
| | | 21 | | | AVAIL | | |
| G | xyz-7 | | 1 | 0 | | | |
| | | 20 | | | AVAIL | | |
| | | 26 | | | AVAIL | | |
| | | 40 | | | AVAIL | | |
| | | 17 | | | AVAIL | | |
| | | 152 | | | AVAIL | | |
| H | xyz-8 | | 0 | 0 | | | |
| | | 10 | | | AVAIL | | |
| | | 32 | | | AVAIL | | |
| ... | ... | ... | | | | | |
| CC | xyz-n | | | | | | |

FIG. 2

| CELL ID | CONDITIONAL C / I RATIO |
|---------|-------------------------|
| S | 24 |
| W | 20 |

FIG. 5

| CELL ID | LOCATION ID | ASSIGNED CHANNELS | DEFICIENCY | LOAD FACTOR | STATUS | SHARING CELL ID | IN USE BY |
|---|---|---|---|---|---|---|---|
| A | xyz-1 | | 0 | 1 | | | |
| | | 15 | | | AVAIL | | |
| | | 37 | | | SHARED | B | B |
| | | 48 | | | AVAIL | | |
| | | 81 | | | AVAIL | | |
| | | 125 | | | AVAIL | | |
| | | 213 | | | AVAIL | | |
| B | xyz-2 | | 2 | 1 | | | |
| | | 10 | | | AVAIL | | |
| | | 31 | | | AVAIL | | |
| | | 52 | | | AVAIL | | |
| | | 77 | | | AVAIL | | |
| | | 89 | | | AVAIL | | |
| | | 102 | | | AVAIL | | |
| | | 37 | | | SHARED | A | B |
| | | | | | | | |
| | | | | | | | |

FIG. 6

| CANDIDATE BORROWER CELL: B | | CANDIDATE FREQ. CHANNEL = 45 | | | |
|---|---|---|---|---|---|
| CELL ID | SHARING CELL ID | FIRST STATE CHANNELS LOCKED | SECOND STATE CHANNELS LOCKED | THIRD STATE CHANNELS LOCKED | FOURTH STATE CHANNELS LOCKED |
| B | R | N | N | N | N |
| R | B | LOCKED | LOCKED | LOCKED | LOCKED |
| L | - | N | N | N | N |
| P | - | N | N | N | N |
| G | V | N | LOCKED | N | LOCKED |
| V | G | LOCKED | N | LOCKED | N |
| T | X | N | N | LOCKED | LOCKED |
| X | T | LOCKED | LOCKED | N | N |

FIG. 11

| | | | | | |
|---|---|---|---|---|---|
| 249 — | CANDIDATE BORROWER CELL : B | | | | |
| 250 — | CANDIDATE DONOR CELL : S | | | | |
| 248 — | CANDIDATE FREQ. CHANNEL = 45 | | 254 | | |
| 252 — | FIRST ADJACENT CHANNEL = 44 | | SECOND ADJACENT CHANNEL = 46 | | |
| | CELL ID | SHARING CELL ID | FIRST STATE CHANNELS LOCKED | SECOND STATE CHANNELS LOCKED | THIRD STATE CHANNELS LOCKED | FOURTH STATE CHANNELS LOCKED |

| | CELL ID | SHARING CELL ID | FIRST STATE CHANNELS LOCKED | SECOND STATE CHANNELS LOCKED | THIRD STATE CHANNELS LOCKED | FOURTH STATE CHANNELS LOCKED |
|---|---|---|---|---|---|---|
| 252 — CHANNEL 44: | | | | | | |
| | M | - | N | N | N | N |
| | Q | - | N | N | N | N |
| 272 — | H | X | N | LOCKED | N | LOCKED |
| 272 — | X | H | LOCKED | N | LOCKED | N |
| 272 — | U | Y | N | N | LOCKED | LOCKED |
| 272 — | Y | U | LOCKED | LOCKED | N | N |
| 254 — CHANNEL 46: | | | | | | |
| | P | - | N | | | |
| | Z | - | N | | | |
| 248 — CHANNEL 45: | | | | | | |
| | B | S | N | N | | |
| 250 — | S | B | LOCKED | LOCKED | | |
| | K | CC | N | LOCKED | | |
| | CC | K | LOCKED | N | | |

METHOD AND SYSTEM FOR ADAPTING A CHANNEL ASSIGNMENT PLAN TO INCLUDE SHARED FREQUENCY CHANNELS

TECHNICAL FIELD OF THE INVENTION

The present invention relates generally to cellular communication systems. More specifically, the present invention relates to adapting a channel assignment plan for a cellular communication system to include shared frequency channels.

BACKGROUND OF THE INVENTION

As cellular communication has become more popular, cellular services providers have felt increasingly pressured to use the cellular radiofrequency (RF) spectrum as efficiently as possible. Greater efficiency allows a service provider to carry more calls using a given amount of RF spectrum. Accordingly, network planning tools exist for assisting network planners in devising channel assignment plans for cellular networks.

Typically, the development of a channel assignment plan begins with the determination of the amount of call traffic to be handled by each cell in the cellular network. Generally, the heaviest hour of cellular call traffic for a cell determines the quantity of frequency channels that should be assigned to that cell to achieve a desired grade of service. The channel assignment plan then assigns particular frequency channels to each cell so that each cell is desirably provided with the required number of channels, while at the same time meeting all of the constraints on frequency channel reuse.

A frequency channel assigned to one cell can be reused in another cell provided that it does not produce an unacceptably high level of interference in any of the cells, and provided that handoffs between the cells are not impaired. Both requirements can be satisfied by having a sufficient distance between cells using the same frequency. Since the number of frequency channels available for a given system is strictly limited, the degree to which frequencies can be reused within a system determines the amount of traffic that can be handled by the system.

When a cellular network is required to carry high volumes of traffic, it is typical for a cellular network planning process to produce an undesirable channel assignment plan. In an undesirable channel assignment, some cells have may have a deficiency in the quantity of channels assigned than are needed for the desired grade of service.

Some prior art systems attempt to mitigate the problems associated with these deficiencies in assigned channels by implementing channel borrowing techniques. One type of technique involves dynamic channel allocation. Dynamic channel techniques determine and change the amount of shared frequency channels assigned to cells in a cellular network based on current need.

A problem with dynamic channel allocation techniques relates to the physical complexity of the system employing such a technique. Specifically, the base station of each cell must be able to transmit and receive not only on the channels specifically allocated to that cell, but also on any of the channels that are allocated dynamically from, for example, a central pool of channels. This also causes additional complexity in the management of system channel resources.

Another type of channel borrowing involves utilizing channels assigned to neighboring cells. Thus, if a new call finds all channels assigned to the subject cell occupied, the call may not necessarily be blocked. Rather, if the user is also within range of a neighboring cell's base station, the user will try to use a channel that was assigned to the neighboring cell's base station. This link is established through the base station of the neighboring cell. This type of borrowing scheme utilizes the overlapping coverage areas of cellular base stations. With this type of borrowing technique, channels are not temporarily transferred from one base station to another, only the right to use a particular channel is transferred to a user in another cell.

An advantage of this type of channel borrowing is that each cellular base station need only accommodate the channels assigned to the base station itself. The simplicity of such an arrangement has accompanying problems. For example, users of borrowed channels must be in the region of coverage overlap provided by the adjacent cellular base station. As a result, the users tend to be relatively far from the cellular base stations through which they transmit and receive signals. Therefore, the quality of borrowed channel transmissions is lower than that of a cell's regular assigned channels. By utilizing such a channel borrowing system, co-channel interference is also increased because the borrowed channels are used beyond their normal transmission range.

SUMMARY OF THE INVENTION

Accordingly, it is an advantage of the present invention that a system and method are provided for adapting a channel assignment plan to include shared frequency channels;

Another advantage is that the shared frequency channels are identified in the channel assignment plan during cellular network planning;

Yet another advantage of the present invention is that shared channel assignment is biased to favor assignment of shared frequency channels to those cells exhibiting the greatest deficiency in the quantity of channels assigned to them in the channel assignment plan.

The above and other advantages of the present invention are carried out in one form by a method for adapting a channel assignment plan to include shared frequency channels. The method is carried out in a cellular communication network having a channel assignment plan that distinguishes frequency channels assigned to a plurality of cells. The method calls for identifying a borrower cell from the plurality of cells, the borrower cell being assigned a first subset of the frequency channels, and the first subset having a deficiency in a quantity of the frequency channels assigned to the borrower cell. The method further calls for selecting a donor cell from the plurality of cells in response to a load factor for the donor cell, the donor cell being assigned a second subset of the frequency channels. A candidate frequency channel is chosen from the second subset. A quality measure is determined for the candidate frequency channel, and the candidate frequency channel is designated as one of the shared frequency channels in the channel assignment plan when the quality measure exceeds a channel sharing constraint.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a table of an exemplary channel assignment plan;

FIG. 5 shows an exemplary table of donor cells and their respective conditional carrier-to-interference (C/I) ratios;

FIG. 6 shows a table of a portion of channel assignment plan 28 following an iteration of the shared channel assignment process;

FIG. 11 shows a table of information generated in response to the execution of the co-channel C/I ratio evaluation subprocess;

FIG. 13 shows a table of information generated in connection with the execution of the adjacent channel C/I ratio evaluation subprocess.

DETAILED DESCRIPTION OF THE PREFERRED EMBODIMENTS

Figure 1:
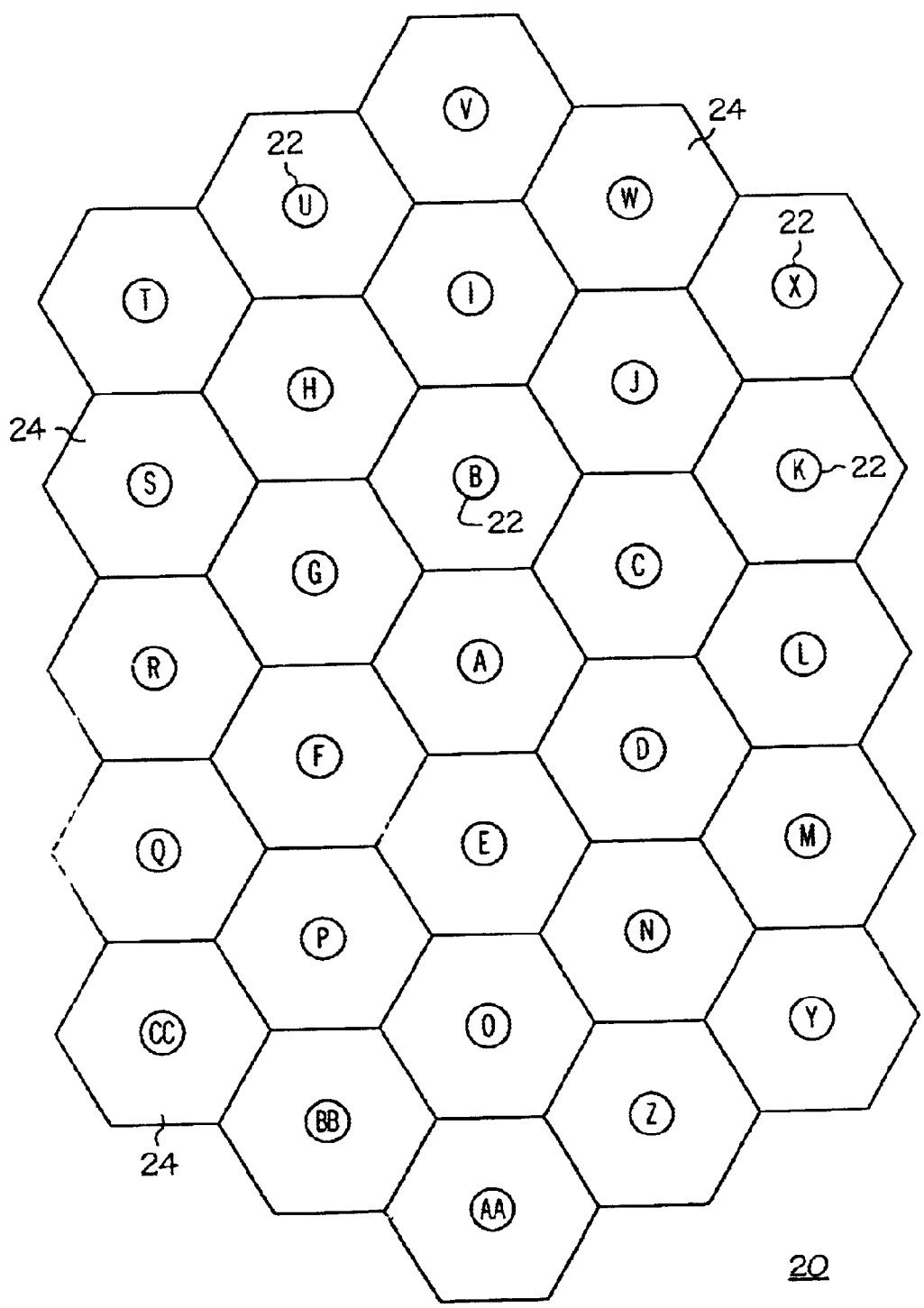
FIG. 1 shows a schematic layout diagram of an exemplary cellular communication network.

FIG. 1 shows a schematic layout diagram of an exemplary cellular communication network 20. Network 20 includes a number of base stations 22, referenced using alphabetic characters A–CC. Each base station 22 controls at least one cell 24 or a face or sector of cell 24. For purposes of the present description, the term "cell" hereinafter applies both to an entire cell and to an individual face or sector of a cell. Base stations 22 may couple to mobile telephone switching offices (not shown) in a manner well known in the art.

FIG. 1 illustrates cells 24 as being non-overlapping hexagonal shapes of equal size and without gaps therebetween. This hexagonal representation is convenient for schematically denoting a cell's area. Those skilled in the art will appreciate that the actual shape and size of cells 24 will vary from cell to cell, and that some overlap and gaps will appear between cells 24.

FIG. 2 shows a table 26 of a simplified channel assignment plan 28 for network 20. Channel assignment plan 28 provides a list of cell identifiers 30, referenced by alphabetic characters A–CC to correspond to base stations 22 providing radio communication coverage for their particular cells 24 (FIG. 1), as shown in network 20. Plan 28 also includes location identifiers 32 for each of base stations 22 and sets of frequency channels 34 assigned to each of base stations 22. The assignment of frequency channels 34 is made through the utilization of a network planning tool (not shown).

A fixed channel assignment scheme is commonly used. In fixed channel assignment, constraints are established consistent with exceeding some minimum predetermined carrier-to-interference (C/I) ratio. The C/I ratio for a particular frequency is defined as the ratio of the carrier signal strength (from the base station or cellular telephone) at that particular frequency to the interference at the particular frequency. The interference is the sum of the unwanted signal power from sources other than the source of the carrier signal. Thus, the C/I ratio indicates the interference potential of particular channel assignment patterns.

When the C/I ratio for a given channel used in a given cell exceeds a predetermined minimum threshold, typically set at about 18 dB, voice quality is deemed acceptable. Hence, channels are assigned to cells in a manner which ensures that each channel in each cell will meet or exceed a minimum predetermined C/I ratio, assuming all channels are concurrently in use. Other constraints, such as a minimum frequency separation, adjacent channel constraints, and co-site constraints, that are consistent with exceeding the minimum predetermined C/I ratio may also be imposed.

Accordingly, from the perspective of the service provider, each frequency channel 34 in channel assignment plan 28 provides acceptable voice quality and is therefore indistinguishable on the basis of voice quality from other frequency channels which might have been assigned. Any channel 34 assigned to a call provides acceptable signal quality up to the point where all channels which share radio coverage area, are in use. At that point, the next call may be blocked because communication services cannot be provided to the next call. The present invention alleviates the problem of blocked calls by adapting channel assignment plan 28 to include shared frequency channels (discussed below).

In a preferred embodiment of the present invention, plan 28 is adapted to include parameters that will be used to designate ones of frequency channels 34 as shared frequency channels (described below). A shared frequency channel is one of channels 34 that is designated for use by two of cells 24 providing that frequency channel meets some predetermined channels sharing constraints (discussed below) prior to its assignment as a shared frequency channel.

The adaptation of plan 28 includes a deficiency value 36 for each of base stations 22. Deficiency value 36 is generated by determining a difference between the quantity of channels desired to carry the planned call traffic load within the corresponding one of cells 24 and the actual quantity of assigned frequency channels 34 for the corresponding one of base stations 22.

Following channel assignment, deficiency value 36 is generated. Deficiency value 36 is zero for any of cells 24 that are assigned all of their desired number of frequency channels 34, as illustrated by cells 24 referenced using alphabetic characters A, C, E, F, and H. Deficiency value 36 is greater than zero for any of cells 24 that were not assigned all of their desired number of frequency channels 34, as illustrated by cells 24 referenced using alphabetic characters B, D, and G. Thus, those cells 24 having the highest deficiency value 36 are in the greatest need for additional frequency channels 34.

Plan 28 is also adapted to include a load factor 38, a shared channel status (STATUS) 40, a sharing cell ID 42, and an IN USE status 44. Load factor 38 indicates each of frequency channels 34 that are currently being shared, that is, either being lent or being borrowed by cell 24. Accordingly, in the initial state following channel assignment, load factor 38 is set to zero for each of cells 24. Shared channel status 40 indicates, for each frequency channel 34, its availability (AVAIL) or its unavailability (SHARED) to be shared. Deficiency value 36, load factor 38, and shared channel status 40 are utilized to assign ones of frequency channels 34 as shared frequency channels.

Sharing cell ID 42 associates one of cells 24, i.e., a borrower cell, to share a particular one of frequency channels 34. IN USE status 44 indicates when frequency channel 34 is currently in use by one of cells 24 sharing the one of frequency channels 34. IN USE status 44 is desirable to "lock" a frequency channel 34 to prevent its use by both of cells 24 at the same time so as to ensure that the minimum predetermined C/I ratio will be maintained.

In the initial state, prior to any designation of shared frequency channels, shared channel status 40 indicates the availability (AVAIL) for sharing for each of cells 24, and sharing cell ID 42 and IN USE status 44 are blank. The ensuing methodology described herein further adapts plan 28 to designate ones of frequency channels as shared frequency channels.

Referring momentarily to FIG. 6, FIG. 6 shows a portion of channel assignment plan 28 adapted to include a shared frequency channel 45. As shown in plan 28 at FIG. 6, for any of cells 24 sharing at least one of assigned frequency channels 34, load factor 38 is greater than zero. For example, a shared frequency channel 45, represented using numeric characters "37" is shown. Shared frequency channel 45 is shared by each of cells 24. Accordingly, each of cells 24 exhibits a load factor 38 of "1".

With reference back to FIG. 2, cells 24 are shown being assigned and needing only a few of frequency channels 34 for clarity of illustration. It should be readily apparent to those skilled in the art that a conventional channel assignment plan may include many more frequency channels 34 assigned to each of cells 24 than as shown. In addition, actual channel number designations for frequency channels 34 vary significantly from that which is shown, for example, the channel number designations may follow the conventional AMPS frequency channels designations.

Figure 3:
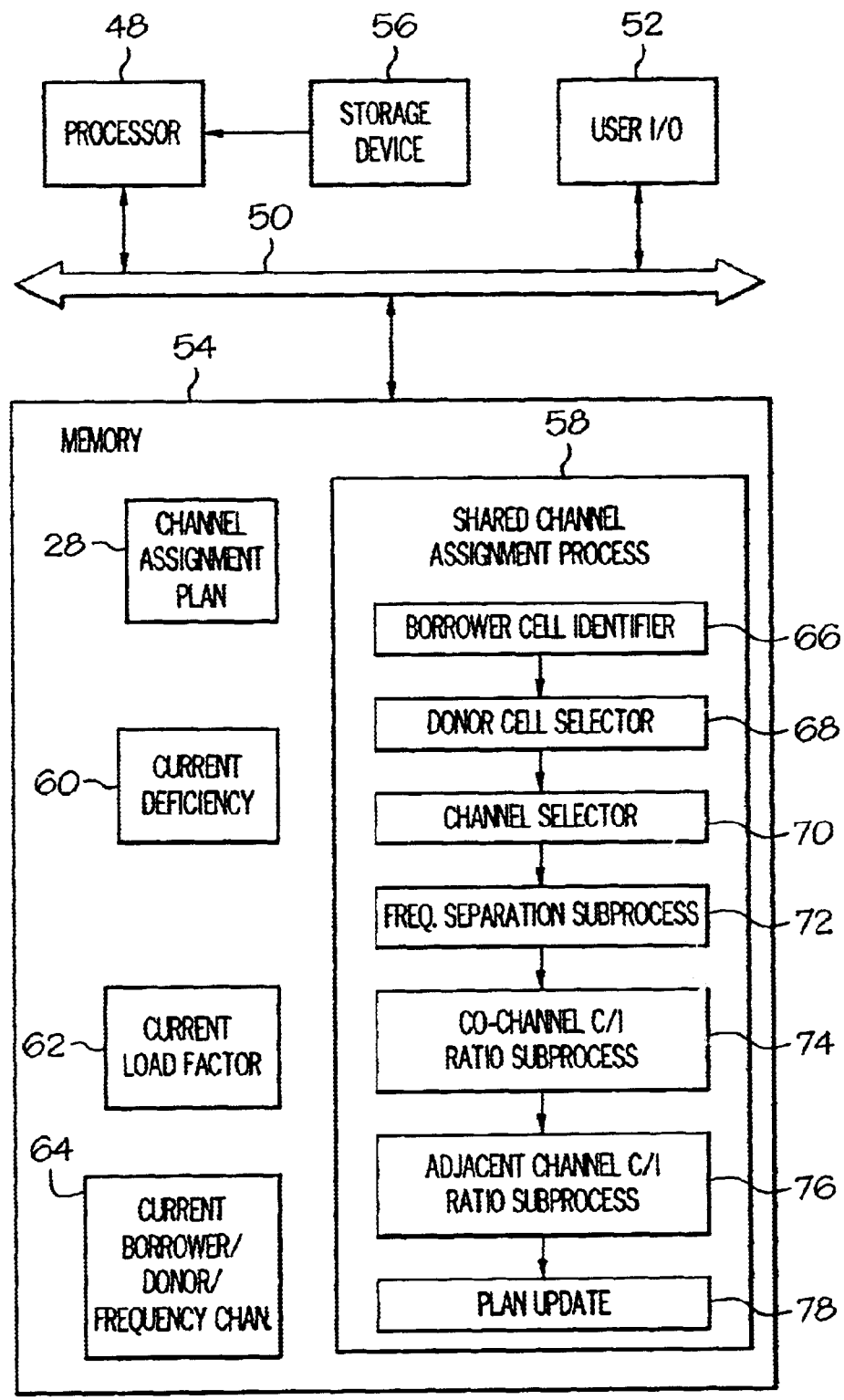
FIG. 3 shows a simplified block diagram of a system for adapting the channel assignment plan to include shared frequency channels.

FIG. 3 shows a simplified block diagram of a system 46 for adapting channel assignment plan 28 to include share ones of frequency channels 34, such as shared frequency channel 45 (FIG. 6). System 46 includes a processor 48 on which the methods according to the various embodiments of the invention can be practiced. Processor 44 is coupled via a bus 50 to user I/O (input/output) interface 52 and memory 54.

Processor 48 also includes a data reader (not shown) for reading data, such as channel assignment plan 28, from a storage device 56. The data reader may include a hard disk drive internal or external to processor 48, a tape drive, floppy disk drive, CD-ROM, or a combination thereof. Storage device 56 may be a floppy disk, a compact disk, a personal computer memory card international association (PCMCIA) card, and the like.

An input portion of user I/O interface 52 may include, but is not limited to, input devices such as a keyboard, mouse, trackball, joystick, touch sensitive tablet or screen, or a combination thereof for entering data and commands into processor 48. Likewise, an output portion of user I/O interface 52 may include output devices utilizing any known means for displaying textual, graphical, or video images from processor 48. The components of system 46 discussed above may be implemented utilizing several known off-the-shelf components.

Memory element 54 is addressable storage space, accessible by processor 48, which stores information or instructions for use. For example, memory element 54 includes channel assignment plan 28 obtained through download from storage device 56. Alternatively, processor 48 may be utilized during network planning to generate channel assignment plan 28 and store plan 28 in memory 54.

Processor 48 is capable of executing some or all of a number of software routines, for example, a shared channel assignment process 58. In addition, memory 54 has stored therein some or all of the following data, for example, a current deficiency 60, a current load factor 62, and a current borrower/donor/frequency channel triplet 64 generated during the execution of shared channel assignment process 58 (discussed below).

Shared channel assignment process 58 is executed by processor 48 to increase the efficiency of cellular network 20 to carry call traffic. Process 58 does so by assigning frequency channels 34 to be shared between two of cells 24. Plan 58 is implemented to make such pairings of frequency channels 34, such as shared frequency channel 45, by starting with channel assignment plan 28 exhibiting one or more of cells 24 with deficiency values 36 (FIG. 2) greater than zero.

Process 58 includes a series of integrated modules such as a borrower cell identifier 66, a donor cell selector 68, a channel selector 70, a frequency separation evaluation subprocess 72, a co-channel carrier-to-interference (C/I) ratio evaluation subprocess 74, an adjacent channel C/I ratio evaluation subprocess 76, and a channel assignment plan update module 78.

Through the execution of the above named integrated modules, process 58 attempts to lend frequency channels 34 (FIG. 2) biased such that those of cells 24 exhibiting the greatest of deficiency values 36 (FIG. 2) are assigned frequency channels 34 to be shared from those of cells 24 exhibiting the lowest of load factors 38 (FIG. 2). In addition, process 58 performs subprocesses 72, 74, and 76 to ensure that the frequency assignment meets all constraints on frequency separation, and C/I ratios (discussed below). Process 58 is repeated until all of deficiency values 36 are zero or until no additional shared frequency channels 45 (FIG. 6) can be found that satisfy the constraints stipulated in subprocesses 72, 74, and 76.

Figure 4:
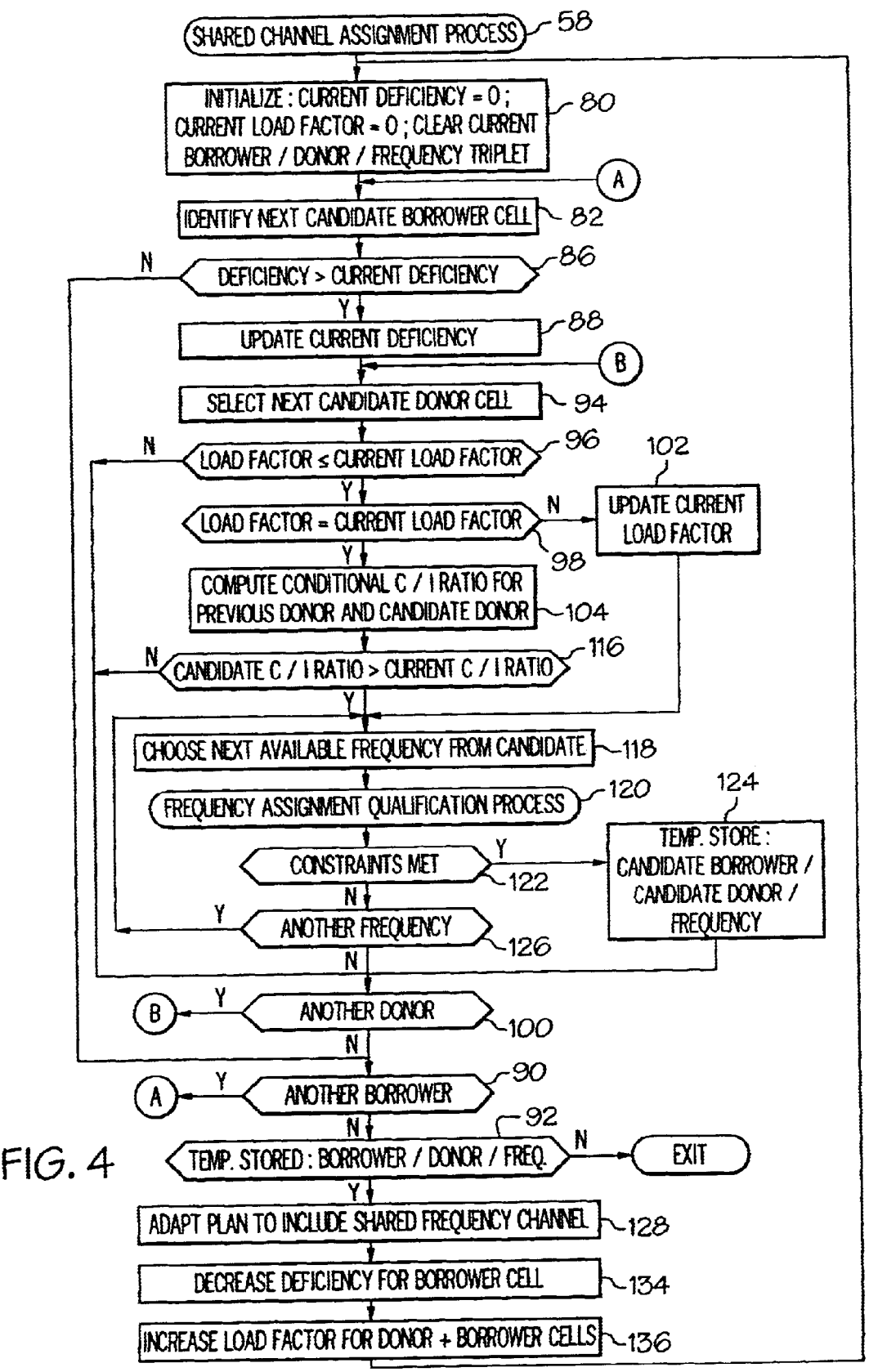
FIG. 4 shows a flow chart of a shared channel assignment process.

FIG. 4 shows a flow chart of shared channel assignment process 58. Process 58 may be initiated by processor 48 (FIG. 3) following receipt of or following the generation of channel assignment plan 28 (FIG. 2). Process 58 begins with a task 80.

Task 80 is a system initialization task performed to set current deficiency 60 (FIG. 3) equal to zero, set current load factor (FIG. 3) equal to infinity, and to clear current borrower/donor/frequency triplet 64 (FIG. 3) in preparation for an iteration of process 58.

Following task 80, a task 82 is performed. Task 82 causes processor 48 (FIG. 3) to identify a next candidate borrower cell. Referring momentarily to table 26 (FIG. 2), candidate borrower cells 84 are identified as those of cells 24 having a deficiency value 36 greater than zero. That is, candidate borrower cells 84 are represented using the alphabetic characters B, D, and G. In the instance that task 82 is being performed during a first iteration, processor 48 may simply identify the first of candidate borrower cells 84 detected in plan 28. For example, at task 82, processor 48 identifies a first candidate borrower cell 84', represented by the alphabetic character "B".

In response to task 82 (FIG. 4), a query task 86 determines if deficiency value 36 (FIG. 2) for first candidate borrower cell 84' is greater than current deficiency 60.

When query task 86 determines that deficiency value 36 for first candidate borrower cell 84' is greater than current deficiency 60, process 58 proceeds to a task 88 (discussed below). However, when query task 86 determines that deficiency value 36 for first candidate borrower cell 84' is less than current deficiency 60, process 58 proceeds to a query task 90.

Query task 90 determines if there is another one of borrower cells 84 in plan 28. In other words, processor 48 searches plan 28 for another one of candidate borrower cells 84 identified having a deficiency value 36 greater than zero. When another one of candidate borrower cells 84 is not identified, process 58 proceeds to a query task 92 (discussed below).

However, when query task 90 determines that there is another one of candidate borrower cells 84 in plan 28, program control loops back to task 82 to identify a next one of candidate borrower cells. Thus, tasks 82, 86, and 90 perform the functions of borrower cell identifier 66 (FIG. 3) of shared channel assignment process 58 to detect candidate borrower cells 84. Through the iteration of tasks 82, 86, and 90 a needier one of candidate borrower cells 84 is selected in response to deficiency value 36. In other words, one of candidate borrower cells 84 is identified having a greater need for assignment of another one of frequency channels 34 than a previous candidate borrower cell 84.

Accordingly, in the exemplary scenario of table 26 (FIG. 2), since first candidate borrower cell 84' exhibits a deficiency value 36 of "3" which is greater than current deficiency 60 set to its initial state of zero. In response to the affirmative at task 86, process 58 proceeds to task 88.

Task 88 causes processor 48 to update current deficiency 60 in memory 54 (FIG. 3). That is, current deficiency 60 is set to the value "3".

Following task 88, a task 94 is performed. Task 94 causes processor 48 to select the next candidate donor cell. In a preferred embodiment of the present invention, candidate donor cells 95 (FIG. 2) are all of cells 24 excluding the one candidate borrower cell, in this case first candidate borrower cell 84' (FIG. 2) found following an affirmative response to query task 86. Thus, in the exemplary scenario of table 26, processor 48 selects a first candidate donor cell 95' from candidate cells 95, represented using alphabetic character "A". However, processor 48 need not select the first of candidate donor cells 95 from plan 28 (FIG. 2). Rather, processor 48 could utilize another cell selection criterion, for example the one of candidate donor cells 95 immediately following first candidate borrower cell 84'.

In response to task 94, a query task 96 is performed. Query task 96 compares load factor 38 (FIG. 2) for the selected candidate donor cell, i.e. first candidate donor cell 95', to current load factor 62. When query task 96 determines that load factor 38 for the selected first candidate donor cell 95' is less than or equal to current load factor 62, process 58 proceeds to a query task 98 (discussed below).

However, when query task 96 determines load factor 38 for the first candidate donor cell 95' is not less than or equal to current load factor 62, process 58 proceeds to a query task 100. Query task 100 determines if there is another one of candidate donor cells 95 in plan 28. In other words, processor 48 searches plan 28 for another one of cells 24 excluding the identified candidate donor cell, in this case first candidate donor cell 84'. When another candidate donor cell 95 is not found, process 58 proceeds to query task 90 to identify another one of borrower cells 84. Thus, query task 96 searches for a better one of cells 24 to serve as a donor cell 95 in response to load factor 38, the better one of cells 24 having a lower quantity of frequency channels 34 currently being loaned or shared than the previous one of candidate donor cells 95.

With reference back to query task 96, during a first iteration of query task 96, current load factor 62 is infinity as set during initialization task 80. Thus, during a first iteration of query task 96, load factor 38 for first candidate donor cell 95' of "0" is less than current load factor 62.

Accordingly, as mentioned previously, an affirmative to query task 96 causes process 58 to proceed to query task 98. At query task 98, processor 48 determines if load factor 38 for first donor cell 95' (FIG. 2) is equal to current load factor 62. When load factor 38 for first candidate donor cell 95' is not equal to current load factor 62, as is the case for first candidate donor cell 95', process 58 proceeds to a task 102.

At task 102, processor 48 updates current load factor 62. Thus, during a first iteration of query task 98, current load factor 62 initially set to infinity is updated with load factor 38 for first candidate donor cell 95'. Accordingly, in response to task 102, current load factor 62 is now zero.

When load factor 38 for a candidate donor cell 24 is equal to current load factor 62 in task 98, process 58 proceeds to a task 104. Task 98 identifies those special cases in which two of cells 95, a previous candidate donor cell and the next one of candidate donor cells 95 selected in response to task 94, are sharing the same quantity of frequency channels 34. Task 104 subsequently causes processor 48 to further evaluate the candidate donor cell 95 against the previous one of donor cells 95 selected at task 94.

Figure 5:
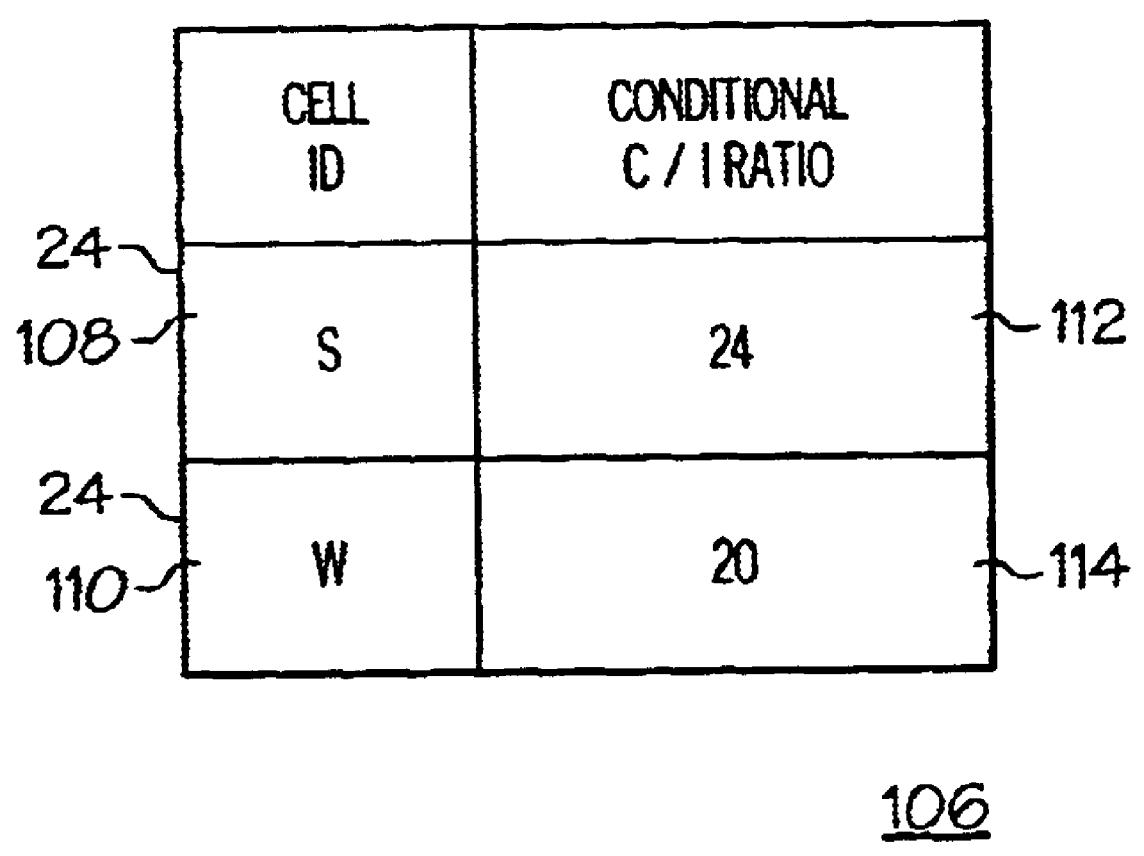

At task 104, processor computes a conditional C/I ratio for the current candidate donor cell and the candidate donor cell. Referring to FIG. 5 in connection with FIG. 4, FIG. 5 shows an exemplary table 106 of a previous donor cell 108, referenced using alphabetic character "S", and a candidate donor cell 110, referenced using alphabetic character "W", and their respective first and second conditional C/I ratios 112 and 114.

First conditional C/I ratio 112 indicates the interference potential when one of frequency channels 34 which is assigned to previous donor cell 108 and is shared with the candidate borrower cell 84. Likewise, second C/I ratio 114 indicates the interference potential of one of frequency channels 34 which is assigned to candidate donor cell 110 and is shared with candidate borrower cell 84. First and second conditional C/I ratios 112 and 114 are independent of a particular transmitting frequency channel. Rather, ratios 112 and 114 are a function of the propagation environment, such as terrain, building clutter, propagation over water, and so forth.

With continued reference to FIGS. 4–5, following task 104, a query task 116 is performed. At task 116, processor 48 (FIG. 3) determines if second conditional C/I ratio 114 for candidate donor cell 110 is greater than first C/I ratio 112 for previous donor cell 108. When second conditional C/I ratio 114 is not greater than first conditional C/I ratio 112, process 58 proceeds to task 100 to search for another one of candidate donor cells 95 (FIG. 2).

However, when query task 116 determines that second conditional C/I ratio 114 is greater than first conditional C/I ratio 112, process 58 proceeds to a task 118. Thus, query task 116 determines that candidate donor cell 110 may be a better one of cells 24 to serve as a donor cell in the special case where load factors 38 (FIG. 2) for previous and candidate donor cells 108 and 110, respectively, are equivalent by evaluating its potential for interference within cellular network 20 (FIG. 1). Likewise, following a negative response at query task 98 and updating current load factor 62 (FIG. 3) at task 102, process 58 proceeds to task 118.

Accordingly, program flow through tasks 94, 96, 98, 100, 102, 104, and 116 perform the functions of donor cell selector 68 (FIG. 3) of shared channel assignment process 58. Through the iteration of tasks 94, 96, 98, 100, 102, 104, and 116 a better one of candidate donor cells 95 is selected in response to the determination of load factors 38. In other words, a better candidate donor cell 95 is identified as one having a greater availability of sharable ones of frequency channels 34 than the previous candidate donor cell 95. Additionally, in the case of tied load factors, in response to the generated conditional C/I ratios.

Following the successful selection of a candidate donor cell 95, task 118 causes processor 48 to choose a next available frequency channel 34 from candidate donor cell 95. The next available frequency channel 34 is chosen in response to shared channel status 40 (FIG. 2). Returning to the example shown in table 26 (FIG. 2), in which first candidate donor 95' is selected, shared channel status 40 indicates a first frequency channel 34' represented using numeric characters "15", assigned to first candidate donor cell 95' is available, referenced using the abbreviation, AVAIL. Thus, task 118 causes processor 48 (FIG. 3) to choose first frequency channel 34'.

In response to task 118, processor 48 performs a channel assignment qualification process 120 to test first frequency channel 34' against channel sharing constraints (described below) to determine whether first frequency channel 34' may be suitable as shared frequency channel 45. Channel assignment qualification process 120 is described in detail below. Suffice to say, following the execution of channel assignment qualification process 120, shared channel assignment process 58 proceeds to a query task 122.

At query task 122, processor 48 determines if all constraints stipulated in channel assignment qualification process 120 are met for first frequency channel 34'. These constraints include frequency separation constraints, co-channel C/I ratio constraints, and adjacent channel C/I ratio constraints and will be described in detail in connection with process 120. When all constraints are met for first frequency channel 34', process 58 proceeds to a task 124.

Task 124 causes processor 48 to temporarily store first candidate borrower 84', first candidate donor 95', and first frequency channel 34' in memory 54. In particular, processor 48 overwrites current borrower/donor/frequency channel triplet 64 with first candidate donor 84', first candidate donor 95', and first frequency channel 34'. Following task 124, process 58 proceeds to query task 100 to determine if there is another of one of candidate donor cells 95 for first candidate donor 84' as discussed above.

However, at task 122, when all constraints stipulated in process 120 are not met for first frequency channel 34', process 58 proceeds to a query task 126 to determine if first candidate donor 95' has associated therewith, a second one of frequency channels 34. In an affirmative response to query task 126, process 58 loops back to task 118 to select the next available frequency from those frequency channels 34 assigned to first candidate donor 95'.

Accordingly, program flow through tasks 118, 120, 122, 124, and 126 perform the functions of channel selector 70 (FIG. 3) of shared channel assignment process 58. Through the iteration of tasks 118, 120, 122, 124, and 126, processor 48 evaluates each of frequency channels 34 assigned to a selected candidate donor cell 95 until either one of frequency channels 34 is found that meets the constraints set forth in frequency assignment qualification process 120 or until there are no more of frequency channels 34 assigned to the selected candidate donor cell 95 o evaluate.

When query task 126 determines there are no more of frequency channels 34 to be evaluated for first candidate donor cell 95', process 58 proceeds to task 100 to determine if there is another candidate donor cell 95. In other words, task 100 results in process 58 considering all of cells 24 (FIG. 2) as a candidate donor cell 95, excluding the current candidate borrower cell 84 (FIG. 2).

When query task 100 determines there are no more candidate donor cells from cells 24, process 58 proceeds to task 90 to select another one of borrower cells 84 (FIG. 2). In other words, task 90 results in process 58 considering all of candidate borrower cells (FIG. 2).

As mentioned previously, when task 90 determines that there are no more candidate borrower cells 84, process 58 proceeds to query task 92. At query task 92, processor 48 (FIG. 3) determines if a borrower/donor/frequency channel 64 (FIG. 3) are stored in memory 54 (FIG. 3), as a result of task 124, described above. When a memory address associated with borrower/donor/frequency channel 64 is clear as initialized in task 80, process 58 exits. Process 58 must exit following the iterative processes described above when borrower/donor/frequency channel 64 is clear. Process 58 can exit even when there are remaining ones of cells 24 (FIG. 2) with deficiency values 36 (FIG. 2) that are greater than zero.

When query task 92 determines that the memory address associated with borrower/donor/frequency channel 64 is not clear, i.e., candidate borrower/candidate donor/frequency channel were stored in memory 54 (FIG. 3) at task 124, process 58 proceeds to a task 128.

Referring to FIG. 6 in connection with task 128, FIG. 6 shows a portion of channel assignment plan 28 adapted to include shared frequency channel 45. At task 128, channel assignment plan 28 (shown in FIG. 6) is adapted to include shared frequency channel 45.

Through the execution of process 58, a determination was made that second one of assigned frequency channels 34, assigned to first candidate donor 95', meets all of the necessary constraints to be designated shared frequency channel 45. Thus, at task 128, shared frequency channel 45 is assigned to second candidate borrower 84', as shown through the addition of the numeric characters "37" to the set of frequency channels 34 assigned to second candidate borrower 84'. In addition, shared channel status 40 associated with shared frequency channel 45 now indicates that frequency channel 34, represented using "37" is SHARED. Likewise, sharing cell ID 42 for shared frequency channel 45 assigned to cell A is sharing with cell B, and sharing cell ID 42 for shared frequency channel 45 assigned to cell B is sharing with cell A. Thus, cells A and B form a pair 132 for sharing shared frequency channel 45. Once shared channel status 40 indicates frequency channel 34 is one of shared frequency channels 45, it is no longer available to be shared with any other of cells 24.

In connection with designating one of frequency channels 34 as shared frequency channel 45 in task 128, a task 134 is performed. Task 134 causes processor 48 to decrease deficiency value 36 for first candidate borrower cell 84', identified using alphabetic character "B". As shown, deficiency value 36 is decreased, due to the addition of shared frequency channel 45 to its set of assigned frequency channels 34.

In addition to task 134, a task 136 is performed. Task 136 causes processor 48 to increase load factor 38 for both of first borrower cell 84' and first donor cell 95', identified as "A" and "B". As shown, load factor 38 is increased by one, since now each of cells "A" and "B" include one of shared frequency channels 45 in their respective sets of assigned frequency channels 34. Following task 136, program control loops back to task 80 to initialize current deficiency 60 (FIG. 3) to zero, current load factor 62 (FIG. 3) to infinity, and to clear the memory address associated with current borrower/donor/frequency channel 64 (FIG. 3) so as to attempt to designate another borrower cell and donor cell with another one of frequency channels 34.

Figure 7:
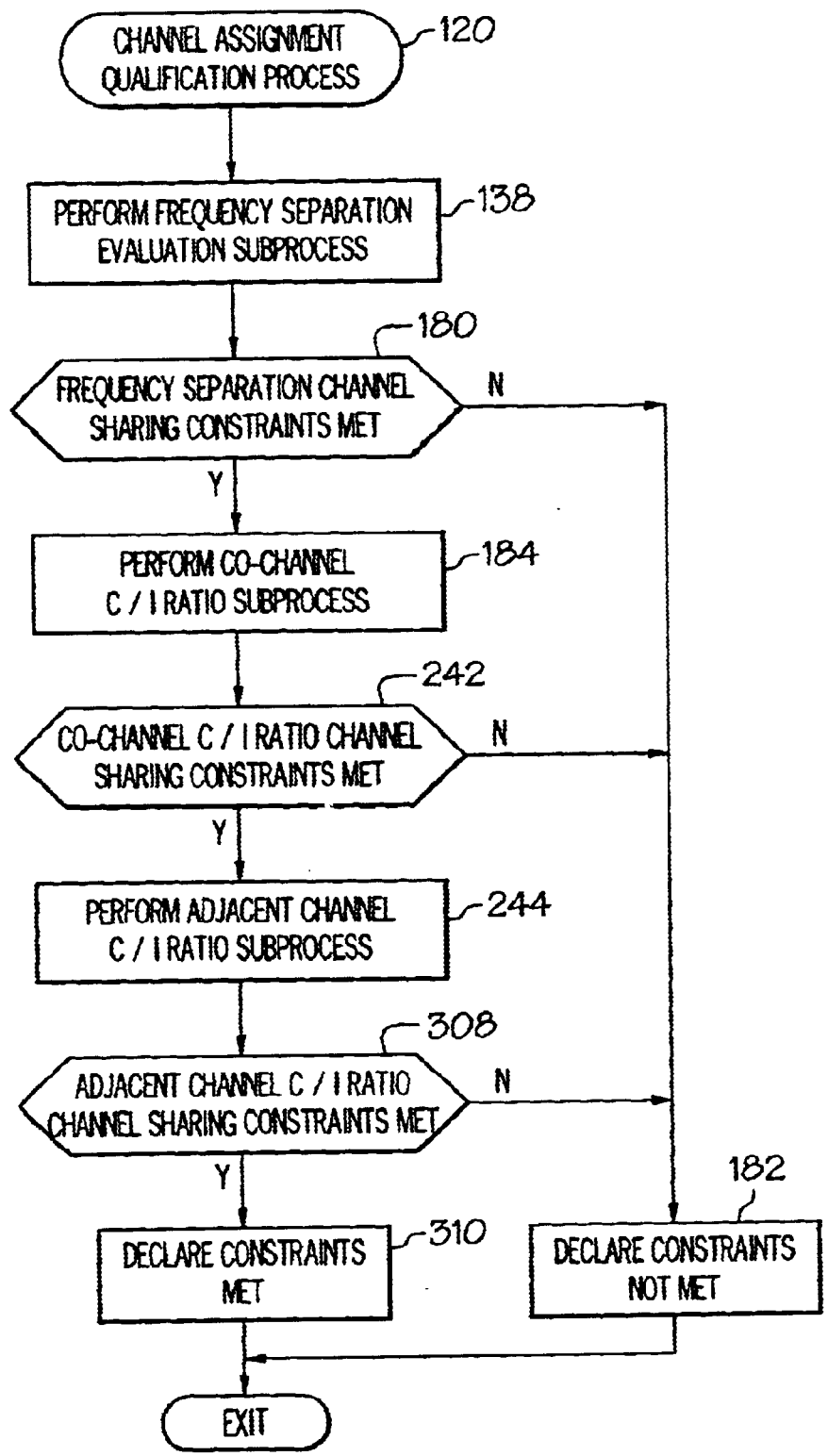
FIG. 7 shows a flow chart of a channel assignment qualification process.

FIG. 7 shows a flow chart of channel assignment qualification process 120 mentioned in shared channel assignment process 58 (FIG. 4). Channel assignment qualification process 120 is performed during the execution of shared channel assignment process 58 to conduct a series of subprocesses, or tests, to measure the quality of the chosen one of frequency channels 34 against channel sharing constraints. The subprocesses are executed to determine whether the chosen one of frequency channels 34 may be designated as one of shared frequency channels 45 (FIG. 6). Qualification process 120 begins with a task 138. Task 138 causes processor 48 (FIG. 3) to execute frequency separation evaluation subprocess 72 (FIG. 3).

Figure 8:
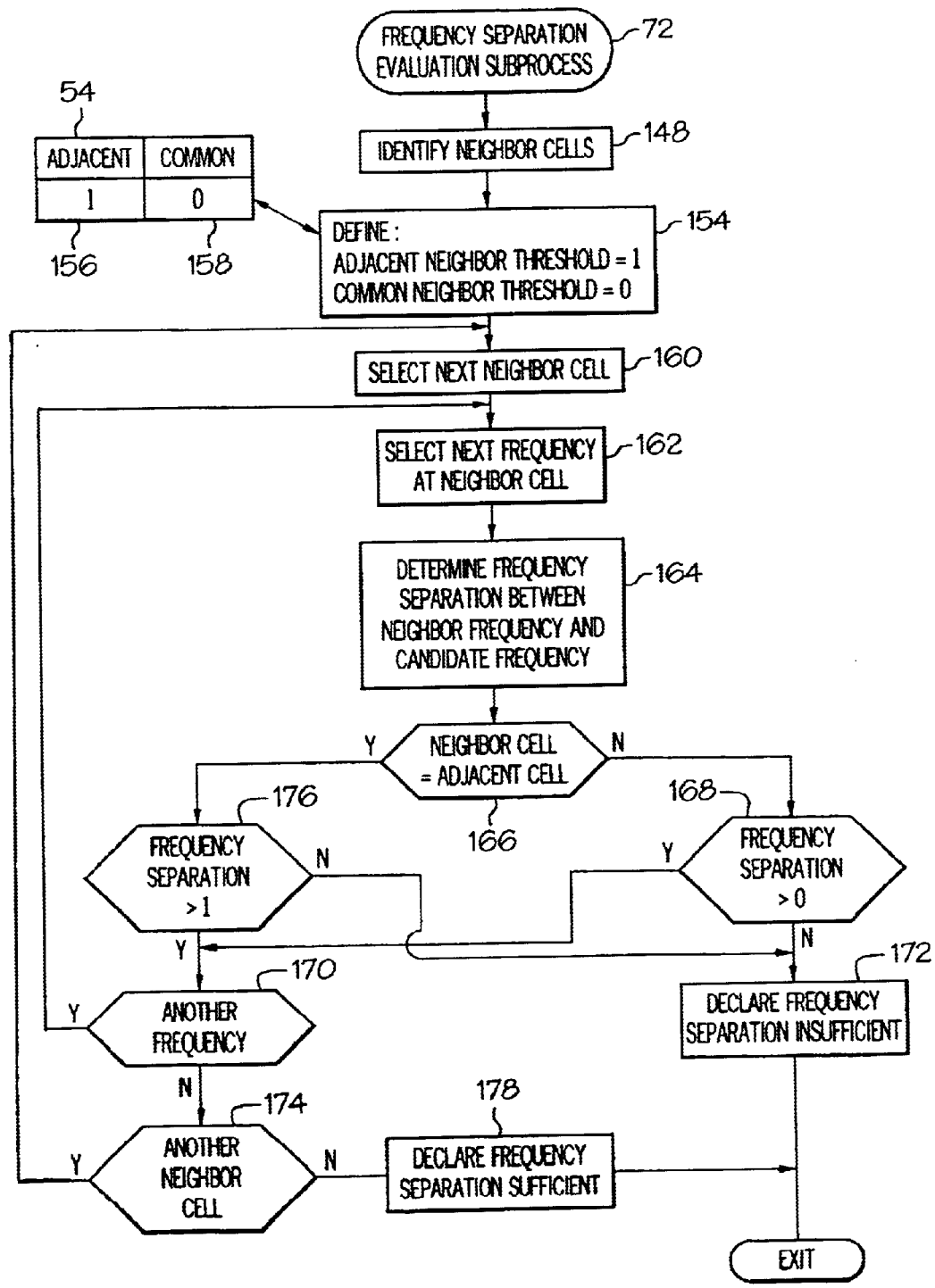
FIG. 8 shows a flow chart of a frequency separation evaluation subprocess.
Figure 9:
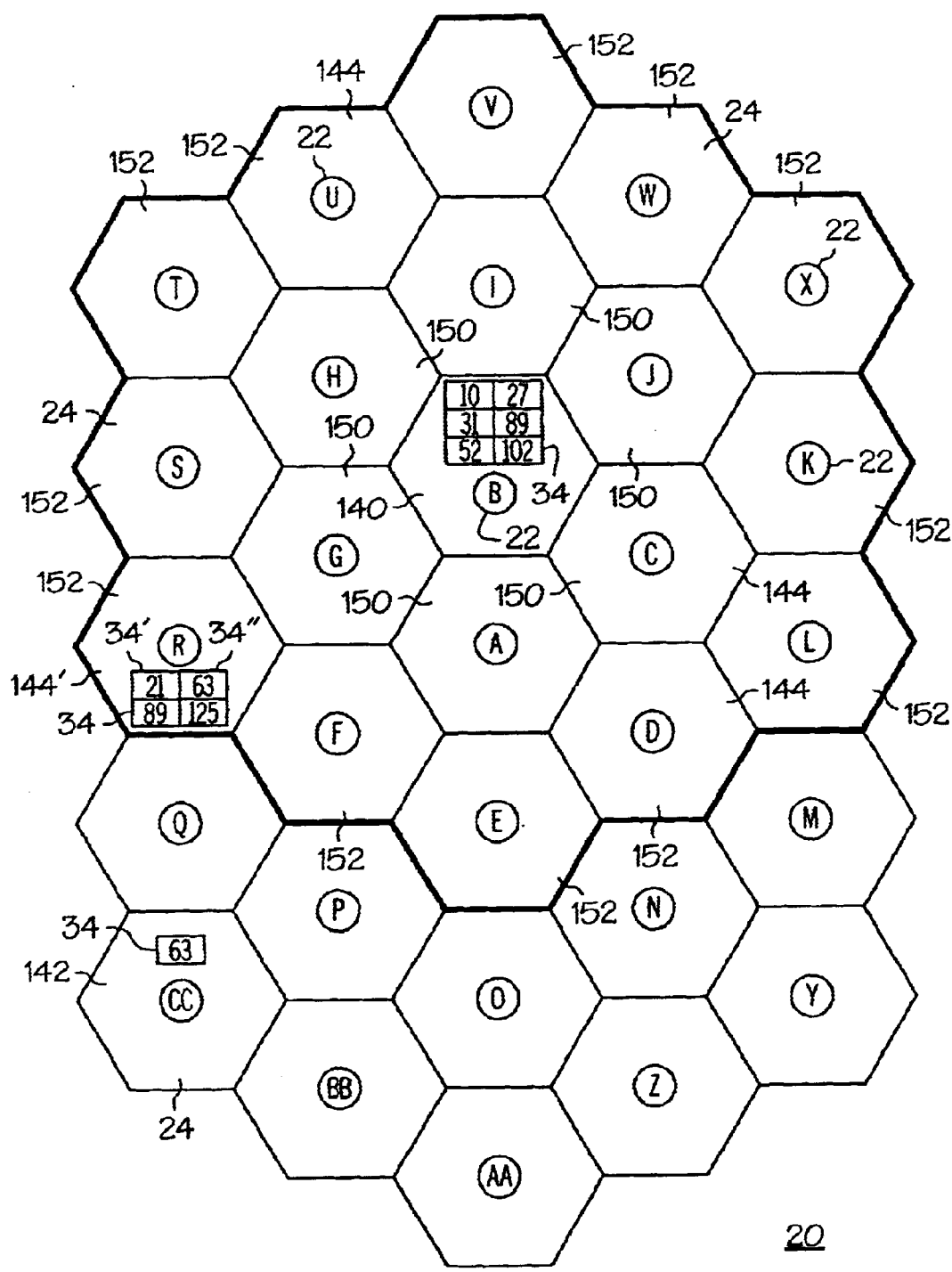
FIG. 9 shows a portion of the cellular network illustrating a candidate donor cell and a plurality of neighbor cells.

Referring to FIGS. 8–9, FIG. 8 shows a flow chart of frequency separation evaluation subprocess 72. FIG. 9 shows a portion of cellular network 20 illustrating a candidate borrower cell 140, a candidate donor cell 142, and a plurality of neighbor cells 144. A frequency channel 146, referenced using numeric characters "63" and chosen during task 118 (FIG. 4) of shared channel assignment process 58 (FIG. 4), is shown in candidate donor cell 142. Generally, frequency separation evaluation subprocess 72 determines if the separation between chosen frequency channel 146 and each of frequency channels 34 assigned to neighbor cells 144 exceeds predetermined minimum thresholds (discussed below). In other words, a quality measure to be examined in subprocess 72 is frequency separation.

Subprocess 72 begins with a task 148. Through the execution of task 148, neighbor cells 144 are identified for candidate borrower cell 140. Identification of neighbor cells 144 may be accomplished by referring to location ID 32 (FIG. 2) of channel assignment plan 28, a coverage map (not shown) for cells 24, and so forth. Once neighbor cells 144 are identified, neighbor cells 144 are further distinguished as adjacent neighbor cells 150 and common neighbor cells 152.

Adjacent neighbor cells 150 are those of cells 24 that are adjacent to candidate borrower cell 140. Common neighbor cells 152 are those of cells 24 that are removed from candidate borrower cell 140 by one of adjacent neighbor cells 150. In other words, common neighbor cells 152 share a common neighbor with candidate borrower cell 140. Thus, the identified adjacent neighbor cells 150 are referenced using alphabetic characters A, C, G, H, I, and J, and the identified common neighbor cells 152 are referenced using alphabetic characters D, E, F, R, S, T, U, V, W, X, K, and L.

Following identification task 148, a task 154 is performed. Through the execution of task 154, an adjacent neighbor threshold 156 and a common neighbor threshold 158 are defined. Thresholds 156 and 158 are channel sharing constraints that define a minimum frequency separation between chosen frequency channel 146 and frequency channels 34 (FIG. 2) assigned to neighbor cells 144.

Adjacent neighbor threshold 156 defines the minimum frequency separation that is to be exceeded between chosen frequency channel 146 and each of frequency channels 34 (FIG. 2) assigned to adjacent neighbor cells 150. In this exemplary scenario, adjacent neighbor threshold 156 is defined to be one of frequency channels 34. In other words, the frequency separation between chosen frequency channel 146 and each of frequency channels 34 assigned to adjacent neighbor cells 150 must be at least two.

Common neighbor threshold 158 defines the minimum frequency separation that is to be exceeded between chosen frequency channel 146 and each of frequency channels 34 assigned to common neighbor cells 152. In this exemplary scenario, common neighbor threshold 158 is defined to be zero In other words, the frequency separation between chosen frequency channel 146 and each of frequency channels 34 assigned to adjacent neighbor cells 150 must be at least one.

Following task 154, a task 160 is performed. Task 160 causes processor 48 (FIG. 3) to select one of neighbor cells 144. For example, processor 48 selects a first neighbor cell 144'.

Following task 160, a task 162 is performed. At task 162, processor 48 selects one of frequency channels 34 assigned to first neighbor cell 144'. For example, processor 48 selects a first frequency channel 34', referenced using the numeric characters "21".

In response to task 162, a task 164 is performed. At task 164, processor 48 determines a frequency separation between first frequency channel 34', channel "21", and chosen frequency channel 146, channel "63". The frequency separation is the difference between channels 63 and 21. Accordingly, in this exemplary scenario, the frequency separation is 42 of frequency channels 34.

Following task 164, a query task 166 determines whether first neighbor cell 144' is equivalent to one of the identified adjacent neighbor cells 150. When neighbor cell 144' is not one of adjacent neighbor cells 150, it follows that first neighbor cell 144' is one the identified common neighbor cells 152. Accordingly, process 120 proceeds to a query task 168.

At query task 168, processor 48 evaluates the determined frequency separation, in this exemplary case the value "42" to determine if the frequency separation is greater than common neighbor threshold 158, i.e., greater than zero. When the frequency separation is greater than common neighbor threshold 158, the channel sharing constraint, namely common neighbor threshold 158 is exceeded for first frequency channel 34' and program control proceeds to a query task 170.

However, at query task 168, when processor 48 determines that the frequency separation is not greater than common neighbor threshold 158, program control proceeds to a task 172. At task 172, processor determines the frequency separation between common frequency channel 146 and at least one of frequency channels 34 assigned to any of neighbor cells 144 is insufficient. Following task 172, subprocess 72 exits and the remaining frequency channels 34 and neighbor cells 144 need not be examined. For example, when chosen frequency channel 146 is compared to a second frequency channel 34" assigned to first neighbor cell 144', it is found that channels 146 and 34" are equivalent, i.e., both are channel 63. Accordingly subprocess 72 proceeds from query task 168 to task 172 to declare the channel sharing constraint, namely common neighbor threshold 158 has not been met, i.e., has been violated.

However, following an affirmative response to query task 168, task 170 determines if there is another one of frequency channels 34 assigned to the selected one of neighbor cells 144 to be evaluated. When there is another one of frequency channels 34 assigned to the selected neighbor cell 144, program control loops back to task 160 to select the next frequency channel 34 and evaluate it against common neighbor threshold 158.

When there is not another one of frequency channels 34 assigned to first neighbor cell 144' to be evaluated, subprocess 72 proceeds to query task 174 to determine if there is another one of neighbor cells 144 whose assigned frequency channels 34 are to be evaluated. When there is another one of neighbor cells 144, subprocess 72 loops back to task 160 to select the next one of neighbor cells 144 and evaluate each of its assigned frequency channels 34.

Returning back to query task 166, following an affirmative response to query task 166 indicating that selected one of neighbor cells 144 is equivalent to one of the identified adjacent neighbor cells 150, subprocess 72 proceeds to a query task 176 to determine if the frequency separation between chosen frequency channel 146 and a selected one of frequency channels 34 assigned to the selected one of the identified adjacent neighbor cells 150 is greater than adjacent channel threshold 156. Thus, query task 176 performed for adjacent neighbor cells 150 is similar to query task 168 performed for common neighbor cells 152, the difference being the particular one of adjacent neighbor and common neighbor thresholds 156 and 158, respectively.

When query task 176 determines the frequency separation is greater than one, subprocess 72 proceeds to query task 170 to evaluate each of frequency channels 34 for the selected adjacent neighbor cell 150 and eventually to query task 174 to evaluate each of neighbor cells 144. When query task 174 determines that there is not another one of neighbor cells 144, that is, all frequency channels 34 for each of neighbor cells 144 have been evaluated, subprocess 72 proceeds a task 178.

At task 178, processor 48 declares that the frequency separation between chosen frequency channel 146 and all of frequency channels 34 assigned to neighbor cells 144 is sufficient. Thus, the channel sharing constraints for frequency separation are met for chosen frequency 146 and subprocess 72 exits.

Referring back to frequency assignment qualification process 120 (FIG. 7), in response to the execution of frequency separation evaluation subprocess 72 at task 138, a query task 180 is performed. At query task 180, processor 48 determines if the frequency separation channel sharing constraints are met. Frequency separation channel sharing constraints are met when subprocess 72 (FIG. 8) exits following task 178 (FIG. 8) Frequency separation channel sharing constraints are not met when subprocess 72 exits following task 172 (FIG. 8).

When query task 180 determines that the frequency separation channel sharing constraints are not met, process 120 proceeds to a task 182. At task 182, processor 48 declares that all channel sharing constraints for chosen frequency channel 146 (FIG. 9) are not met, and subprocess 120 exits.

However, when query task 180 determines that the frequency separation channel sharing constraints are met, process 120 proceeds to a task 184. Task 184 causes processor 48 (FIG. 3) to execute co-channel C/I ratio evaluation subprocess 74 (FIG. 3).

Figure 10:
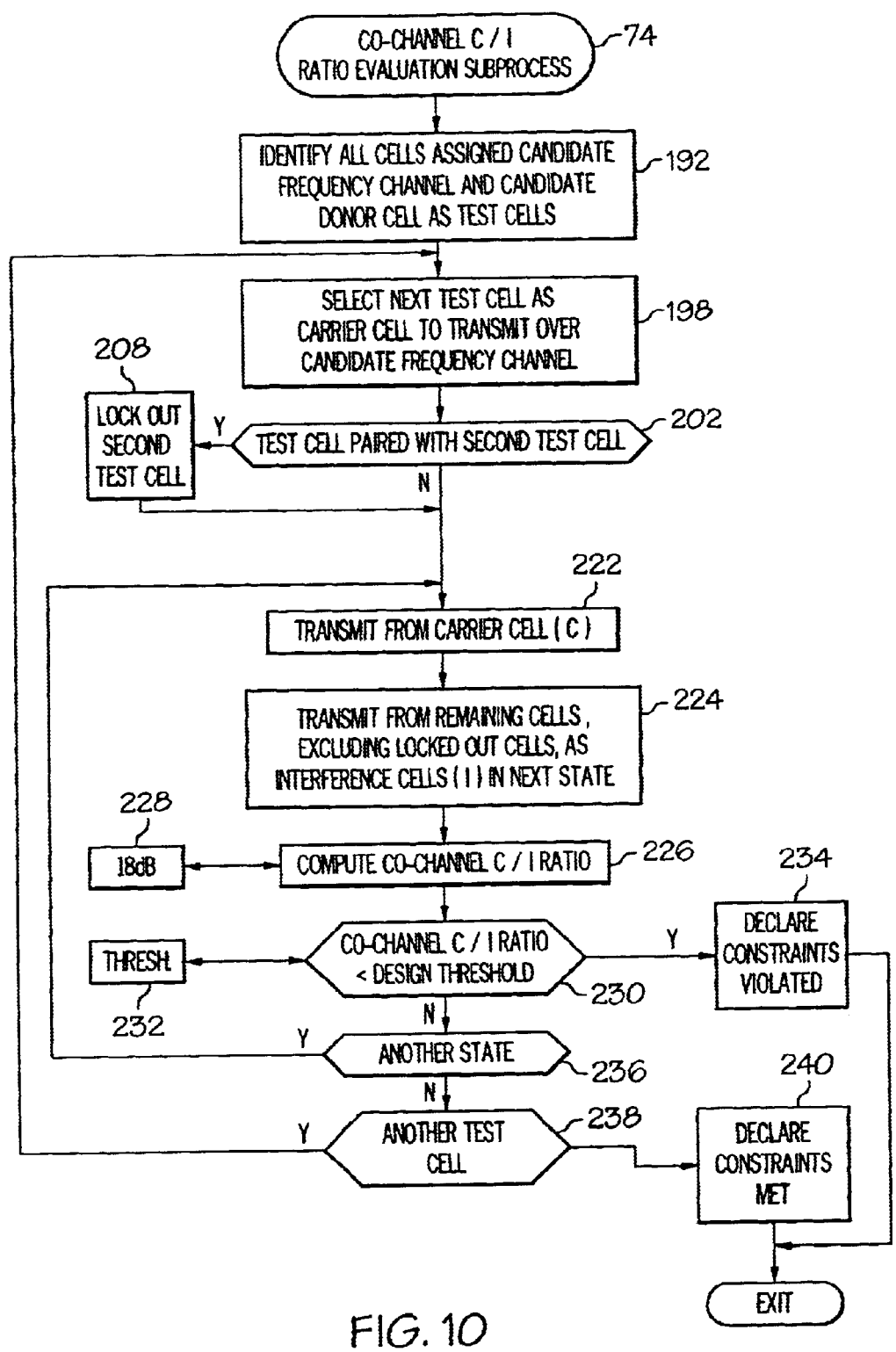
FIG. 10 shows a flow chart of a co-channel carrier-to-interference (C/I) ratio evaluation subprocess

Referring to FIGS. 10–11, FIG. 10 shows a flow chart of co-channel carrier-to-interference (C/I) ratio evaluation subprocess 74. FIG. 11 shows a table 186 of information generated in response to the execution of subprocess 74 for a candidate frequency channel 188 of a candidate donor cell 190. The quality measure to be examined in subprocess 74 is co-channel C/I ratio measurements for the chosen candidate frequency channel.

Subprocess 74 begins with a task 192. At task 192, processor 48 (FIG. 3) identifies all of cells 24 (FIG. 2) that are currently assigned candidate frequency channel 188, including the candidate borrower cell. As shown in a cell ID column 194 of table 186, a set of test cells 196, represented using alphanumeric characters B, R, L, P, G, V, T, and X are identified as being assigned candidate frequency channel 188.

Following task 192, a task 198 is performed. Task 198 causes processor 48 to select one of test cells 196 as a carrier cell to transmit over candidate frequency channel 188. In the exemplary scenario of table 186, a carrier cell 200 is selected. In this case, carrier cell 200 is also candidate borrower cell 190, represented by the alphabetic character "B".

In response to task 192, a query task 202 is performed. At query task 202, processor 48 (FIG. 3) determines of carrier cell 200 is paired with another one of test cells 196. In other words, query task 202 determines if carrier cell 200 shares candidate frequency channel 188 with another test cell 196. As shown in a sharing cell ID column 204 of table 186, carrier cell 200 is candidate borrower cell 190 with a candidate donor cell 205 since they potential share candidate frequency channel 188. Thus, tests cells "B" and "R" form a pair 206.

When query task 202 determines carrier cell 200 is a constituent in pair 206, subprocess 74 proceeds to a task 208. At task 208, test cell "R" is "locked out". That is, for subsequent testing of carrier cell 200, labeled "B", candidate donor cell 205 will be prevented from transmitting. Table 186 shows each of a first transmission state 210, a second transmission state 212, a third transmission state 214, and a fourth transmission state 216. Each of states 210, 212, 214, and 216 indicates which of test cells 196 will be selected to transmit. In each of states 210, 212, 214, and 216, carrier cell 200 is not locked, indicated by the alphabetic character "N" and candidate donor cell 205 is locked out, indicated by the term "LOCKED".

First, second, third, and fourth state columns 210, 212, 214, and 216, respectively, indicate each of the possible combinations of transmitting test cells 196 for the selected carrier cell 200. Some of test cells 196 are unpaired test cells 218, as represented by alphabetic characters L and P. The remaining ones of test cells 196 are pairs 220, as represented by a pair G/V and a pair T/X. For each of pairs 220 only one of test cells 196 can transmit at any given time, as indicated by the LOCKED status in first, second, third, and fourth state columns 210, 212, 214, and 216. This results in $2^N$ states for which the co-channel C/I ratio can be computed.

Following task 208 and when query task 202 determines that carrier cell 200 is not paired with another of test cells 196, subprocess 74 proceeds to a task 222.

At task 222, carrier cell 200 transmits over candidate frequency channel 188. In connection with task 222, a task 224 is performed. At task 224, test cells 196 transmit over candidate frequency channel 188, excluding any locked out cells. As shown in first state column 210, test cells 196, corresponding to L, P, G, and T are transmitting in order to detect their potential for interference to carrier signal 200. In addition, test cells 196, corresponding to V and X are prevented from transmitting.

A task 226 is performed in response to tasks 222 and 224. At task 226, a co-channel C/I ratio 228 is computed. Co-channel C/I ratio is the sum of the interference power from test cells 196, corresponding to L, P, G, and T. Following task 226, a query task 230 is performed.

Query task 230 determines if co-channel C/I ratio 228 is less than a predetermined co-channel C/I ratio threshold 232. Threshold 232 defines a minimum standard, typically 18 dB, at which voice quality is deemed acceptable. Threshold 232 may be stored in memory 54 (FIG. 3) in association with subprocess 74. When query task 230 determines that co-channel C/I ratio 228 is less than co-channel C/I ratio threshold 232, subprocess 74 proceeds to a task 234.

Task 234 declares that a channel sharing constraint, namely co-channel C/I ratio threshold 232 is violated and subprocess 74 exits following task 234.

When query task 230 determines that co-channel C/I ratio 228 is not less than threshold 232, subprocess 74 proceeds to a query task 236. Query task 236 determines if there is another state, or configuration, of transmitting test cells 196. When query task 236 determines that there is another transmission state, subprocess 74 loops back to task 198 to select another state. In the exemplary scenario, of table 186, subprocess 74 loops back to select the next one of first, second, third, and fourth states 210, 212, 214, and 216. However, when query task 236 determines that there is not another state to select, subprocess 74 proceeds to a query task 238.

At query task 238, processor 48 (FIG. 3) determines if there is another one of test cells 196 for which subprocess 74 is to be performed. When there is another one of test cells 196, subprocess 74 loops back to task 198 to select the next one of test cells 196 and subsequently compute and evaluate co-channel C/I ratio as discussed above. However, when all of test cells 196 have been evaluated and query task 238 determines there is not another one of tests cells 196, program control proceeds to a task 240.

Task 240 declares that a channel sharing constraint, namely co-channel C/I ratio threshold 232 is met, i.e., not violated, for each and every test cell 196. Following task 240, subprocess 74 exits.

Referring back to frequency assignment qualification subprocess 120 (FIG. 7), following the execution of co-channel C/I ratio evaluation subprocess 74 at task 184, a query task 242 is performed.

Query task 242 determines if co-channel C/I ratio channel sharing constraints are met. Co-channel C/I ratio channel sharing constraints are met when subprocess 74 (FIG. 10) exits following task 240 (FIG. 10) and co-channel C/I ratio channel sharing constraints are not met when subprocess 74 exits following task 234 (FIG. 10).

When query task 242 determines that co-channel C/I ratio channel sharing constraints are not met, process 120 proceeds to task 182 to declare that the channel sharing constraints are not met, and process 120 exits.

However, when query task 242 determines that co-channel C/I ratio channel sharing constraints are met, process 120 proceeds a task 244. Task 244 causes processor 48 (FIG. 3) to execute adjacent channel C/I ratio evaluation subprocess 76 (FIG. 3). The quality measure to be examined in subprocess 76 is adjacent channel C/I ratio measurements for the chosen candidate frequency channel.

Figure 12:
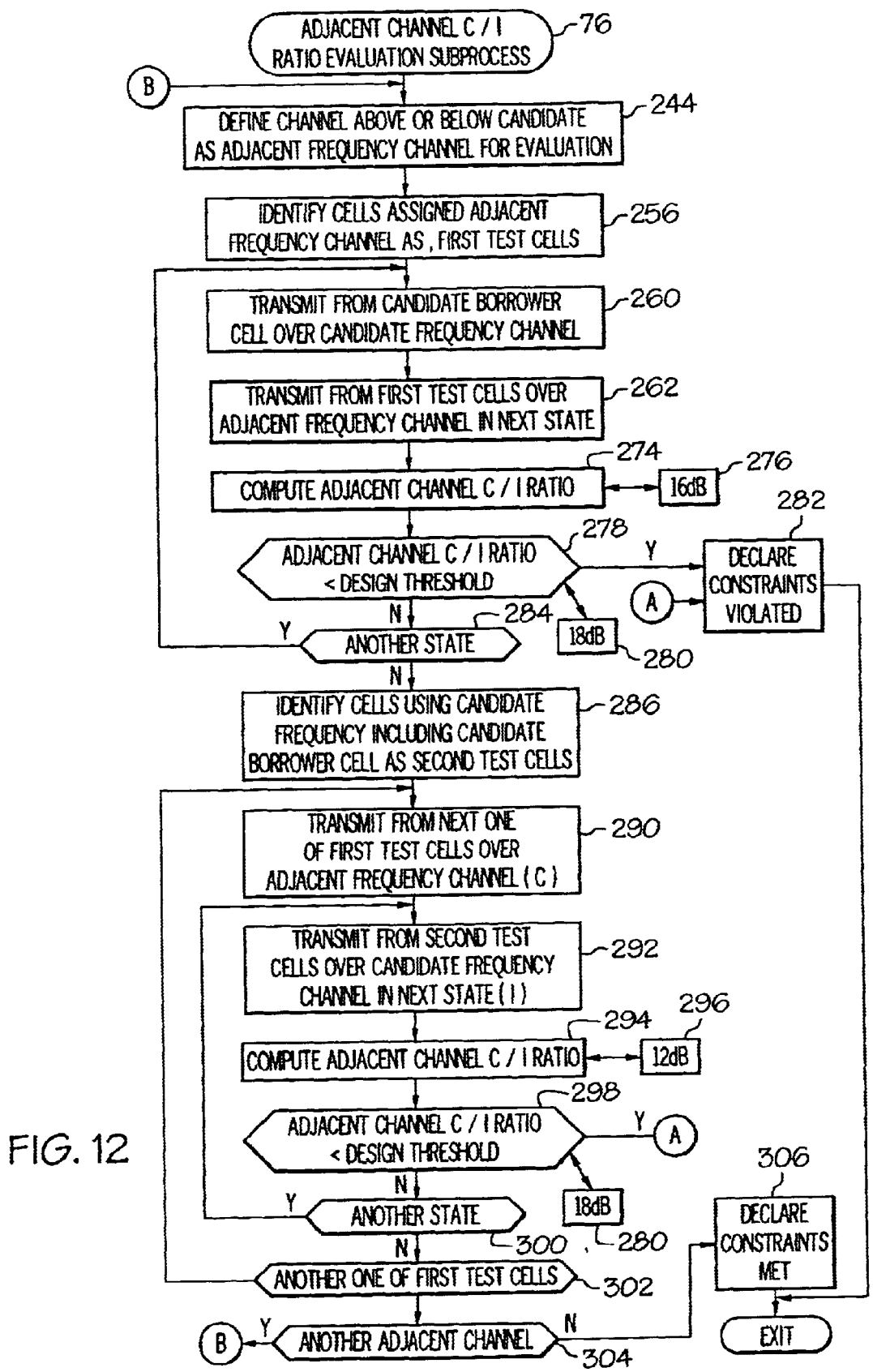
FIG. 12 shows a flow chart of an adjacent channel C/I ratio evaluation subprocess.

Referring to FIGS. 12–13, FIG. 12 shows a flow chart of adjacent channel C/I ratio evaluation subprocess 76. FIG. 13 shows a table 246 of information generated in connection with the execution of subprocess 76 for a candidate frequency channel 248 which may be borrowed by a candidate borrower cell 249 from a candidate donor cell 250. Subprocess 76 is performed to evaluate the potential for interference from the assignment of candidate frequency channel 248 to frequency channels 34 adjacent to, i.e., immediately above and immediately below, candidate frequency channel 248.

Subprocess 76 begins with a task 244. At task 244, processor 48 (FIG. 3) defines one of frequency channels 34 above or below candidate frequency channel 248 as an adjacent frequency channel for evaluation. In the exemplary scenario of table 246, candidate frequency channel 248 is represented using the numeric characters "45". For simplicity, a first adjacent frequency channel 252 is represented using the numeric characters "44" and a second adjacent frequency channel 254 is represented using the numeric characters "46". Thus, task 244 selects one of first and second channels 252 and 254 for evaluation. For clarity of understanding, first adjacent frequency channel 252 is defined as the adjacent frequency channel for evaluation.

Following task 244, a task 256 is performed. At task 256, processor 48 (FIG. 3) identifies each of cells 24 (FIG. 2) that are assigned first adjacent frequency channel 252. Table 246 shows first test cells 258 from cells 24 (FIG. 2) each being assigned first adjacent frequency channel 252.

Following task 256, a task 260 is performed. At task 260, candidate borrower cell 249 transmits over candidate frequency channel 248.

A task 262 is performed in connection with task 260. At task 260 first test cells 258 transmit over first adjacent frequency 252, excluding ones of test cells 258 that are "locked out". Table 246 shows a first state 264, a second state 266, a third state 268, and a fourth state 270 of transmitting first tests cells 258. As shown in first state 264, first test cells 258 (X and Y) are locked out, or prevented from transmitting. They are locked out because they are shared pairs 272 with their corresponding first test cells 258 (H and U) and, as such, cannot transmit when first test cells 258 (H and U) are transmitting.

Following task 262, a task 274 is performed to compute an adjacent channel C/I ratio 276 for the carrier, candidate frequency channel 252 with respect to interference power from first test cells 258 in first state 264.

Following task 274, a query task 278 is performed to compare the computed adjacent channel C/I ratio 276 to a design threshold, for example an adjacent channel C/I ratio threshold 280. When adjacent channel C/I ratio 276 is less than threshold 280, subprocess 76 proceeds to a task 282.

At task 282, processor 48 declares that the channel sharing constraint, namely adjacent channel C/I ratio threshold 280 is not met, i.e., violated. Accordingly, following task 282, subprocess 76 exits with no further C/I ratio computations being performed.

However when query task 278 determines that adjacent channel C/I ratio 276 is less than threshold 280, program control proceeds to a query task 284. At query task 284, processor 48 determines if there is another one of first, second, third, and fourth states 264, 266, 268, and 270 to be evaluated. When there is another state, subprocess 74 loops back to task 260 to transmit from candidate borrower cell 250 over candidate frequency channel 248 and to transmit from first test cells 258 in the next one of states 264, 266, 268, and 270.

However, when query task 284 determines that all states have been tested, subprocess 76 proceeds to a task 286. Thus, tasks 256, 260, 262, 274, 278, and 284 are performed to verify whether the signal quality of candidate frequency channel 248, when it is transmitted from candidate borrower cell 249, will be satisfactory when cells 24 (FIG. 2) assigned first adjacent frequency channel 252 are transmitting.

Beginning with task 286, subprocess 76 now verifies that the power from candidate frequency channel 248 will not unduly interfere with first adjacent frequency channel 252 transmitted from test cells 258. Task 286 is performed to identify those cells 24 (FIG. 2) that are currently assigned candidate frequency channel 248, including candidate borrower cell 249. Table 246 shows second test cells 288 that are assigned candidate frequency channel 248 identified in task 286.

Following task 286, a task 290 is performed. At task 290, one of first test cells 258 transmits over adjacent frequency channel 258 as a carrier.

A task 292 is performed in connection with 290. At task 292, second test cells 288 transmit over candidate frequency channel 248, excluding any "locked out" ones of second test cells 288. Table 246 shows that candidate donor cell 250 and one of second test cells 288, labeled "CC" are locked out in first state 264.

Next a task 294 is performed. At task 294, an adjacent channel C/I ratio 296 is computed from the carrier power produced in response to task 290 and the interference power produced in response to task 292.

Following task 294, a query task 298 is performed to compare the computed adjacent channel C/I ratio 296 to a design threshold, for example, adjacent channel C/I ratio threshold 280. When adjacent channel C/I ratio 296 is less than threshold 280, subprocess 76 proceeds to task 282 to declare that the channel sharing constraints, namely adjacent channel C/I ratio threshold 280 is violated and subprocess 76 exits with no further C/I ratio computations being performed.

However when query task 298 determines that adjacent channel C/I ratio 296 is not less than threshold 280, subprocess 76 proceeds to a task 300, to determine if there is another transmission state of second test cells 288. When there is another state, as shown in exemplary form in second state 266 for second test cells 288, subprocess 76 loops back to task 292. However, when query task 298 determines that there is not another state, subprocess 76 proceeds to a query task 302.

Query task 302 determines if there is another one of first test cells 258 to be evaluated. When there is, program control loops back to task 290 to select another one of first test cells 258 and perform subsequent adjacent channel C/I ratio computations. However, when query task 302 determines that there is not another one of first test cells 302, subprocess 76 proceeds to a query task 304.

Query task 304 determines if there is another one of the adjacent frequency channels to be evaluated. For example, first adjacent frequency channel 252 was evaluated in a first iteration of subprocess 76. Thus, query task 304 determines if there is another adjacent frequency channel, i.e. second adjacent channel 254, for which subprocess 76 is to be performed.

When query task 304 determines that second adjacent frequency channel 254 is to be evaluated, subprocess 76 loops back to task 244 to define and select second adjacent frequency channel 254 for evaluation. However, when query task 304 determines that there is not another one of first and second adjacent channels 252 and 254, i.e., the frequency channels immediately above and below candidate frequency channel 250 to be evaluated, subprocess proceeds to a task 306.

Task 306 declares that the frequency sharing constraint, namely adjacent channel C/I ratio threshold 280 is met for each and every one of first and second test cells 258 and 288, respectively. Following task 304, subprocess 76 exits.

Referring back to frequency assignment qualification subprocess 120 (FIG. 7), following the execution of adjacent channel C/I ratio evaluation subprocess 76 at task 244, a query task 308 is performed.

Query task 308 determines if adjacent channel C/I ratio channel sharing constraints are met. Adjacent channel C/I ratio channel sharing constraints are met when subprocess 76 (FIG. 12) exits following task 306 (FIG. 12) and adjacent channel C/I ratio channel sharing constraints are not met when subprocess 76 exits following task 282 (FIG. 12).

When query task 308 determines that adjacent channel C/I ratio channel sharing constraints are not met, process 120 proceeds to task 182 to declare that the channel sharing constraints are not met, and process 120 exits.

However, when query task 242 determines that co-channel C/I ratio channel sharing constraints are met, process 120 proceeds to a task 310 to declare that all frequency sharing constraints are met for the candidate frequency channel.

Following task 310, process 120 exits. Once process 120 exits, program control of shared channel assignment process 58 (FIG. 4) continues with query task 122 (FIG. 4) as previously described.

In summary, the present invention teaches of a system and method for adapting a channel assignment plan to include shared frequency channels. The method of the present invention is implemented during cellular network planning and is biased to favor assignment of shared frequency channels to those cells exhibiting the greatest deficiency in the quantity of channels assigned to them in the channel assignment plan. This bias is incorporated through the exhaustive search for the neediest borrower. Candidate frequency channels are evaluated against frequency separation, co-channel C/I ratio, and adjacent channel ratio constraints to verify that the candidate frequency channels will not undesirably degrade the performance of the previously assigned frequency channels in the channel assignment plan.

Although the preferred embodiments of the invention have been illustrated and described in detail, it will be readily apparent to those skilled in the art that various modifications may be made therein without departing from the spirit of the invention or from the scope of the appended claims. For example, the tasks described herein may be performed in a different order.

What is claimed is:

1. In a cellular communication network having a channel assignment plan that distinguishes channels assigned to a plurality of cells, a method for adapting said channel assignment plan to include shared channels comprising:

identifying a borrower cell from said plurality of cells, said borrower cell being assigned a first subset of said channels, said first subset having a deficiency in a quantity of said channels assigned to said borrower cell;

selecting a donor cell from said plurality of cells in response to a load factor for said donor cell, said donor cell being assigned a second subset of said channels;

choosing a candidate channel from said second subset;

determining a quality measure for said candidate channel; and designating said candidate channel as one of said shared channels in said channel assignment plan when said quality measure exceeds a channel sharing constraint.

2. A method as claimed in claim 1 wherein said identifying operation comprises:

generating a deficiency value for each of said cells;

detecting candidate borrower cells from said plurality of cells in response to said generated deficiency values; and specifying a needier one of said candidate borrower cells to be said borrower cell, wherein said deficiency value associated with said needier borrower cell indicates that said needier borrower cell as has a greater deficiency in said quantity of said assigned frequency channels than remaining ones of said candidate borrower cells.

3. A method as claimed in claim 1 further comprising:

generating a deficiency value for each of said cells;

detecting candidate borrower cells from said plurality of cells in response to said generated deficiency values; and performing said selecting, choosing, determining, and designating operations for each of said candidate borrower cells.

4. A method as claimed in claim 1 wherein said selecting operation comprises:

ascertaining said load factor for said cells, said load factor representing those of said channels assigned to a corresponding one of said cells that are previously designated as said shared channels; and specifying a better one of said cells to be said donor cell, said better one of said cells exhibiting said load factor that is less than said load factors for the remaining ones of said cells.

5. A method as claimed in claim 1 wherein said selecting operation comprises:

ascertaining a first load factor for a first candidate donor cell from said plurality of cells;

ascertaining a second load factor for a second candidate donor cell from said plurality of cells, said first and second load factors representing those of said channels assigned to corresponding ones of said first and second candidate donor cells that are previously designated as said shared channels;

when said first and said second load factors are equivalent, computing conditional carrier-to-interference (C/I) ratios for said first and second candidate donor cells; and specifying a better one of said first and second candidate donor cells to be said donor cell, said better donor cell exhibiting a first one of said conditional C/I ratios that is greater than a second one of said conditional C/I ratios for the other of said first and second candidate donor cells.

6. A method as claimed in claim 1 wherein:

each of said channels of said second subset exhibits one of an available status and an unavailable status, said unavailable status indicating those of said channels of said second subset that are designated as said shared channels; and said choosing operation picks one of said channels exhibiting said available status.

7. A method as claimed in claim 1 wherein said determining operation comprises:

defining said channel sharing constraint as a frequency separation threshold;

identifying neighbor cells from said plurality of cells, said neighbor cells being proximate said borrower cell;

for each of said neighbor cells, determining a frequency separation between said candidate channel and said channels assigned to said neighbor cell; and verifying said frequency separation threshold is exceeded between said candidate channel and each of said channels assigned to said neighbor cell.

8. A method as claimed in claim 7 further comprising:

distinguishing adjacent neighbor cells as those of said neighbor cells that are adjacent said borrower cell; and defining said frequency separation threshold for said adjacent neighbor cells as being a width of one of said channels.

9. A method as claimed in claim 8 further comprising:

distinguishing common neighbor cells as those of said neighbor cells that are removed from said borrower cell by one of said adjacent neighbor cells; and determining said frequency separation threshold for said common neighbor cells is violated when said candidate channel is equivalent to one of said channels assigned to one of said common neighbor cells.

10. A method as claimed in claim 1 wherein said determining operation comprises:

a) defining said channel sharing constraint as a co-channel carrier-to-interference (C/I) ratio threshold;

b) determining a portion of said plurality of cells that are assigned said candidate channel;

c) computing a co-channel C/I ratio value for said borrower cell in response to said operation b); and d) verifying said co-channel C/I ratio value for said borrower cell exceeds said co-channel C/I ratio threshold.

11. A method as claimed in claim 10 wherein a first cell and a second cell of said portion of said cells share said candidate channel, and said computing operation comprises determining an interference power responsive to a transmission of said candidate channel from one of said first and second cells.

12. A method as claimed in claim 1 wherein said determining operation comprises:

a) defining said channel sharing constraint as an adjacent channel C/I ratio threshold;

b) determining a portion of said plurality of cells that are assigned an adjacent channel, said adjacent channel being adjacent to said candidate channel;

c) computing an adjacent C/I ratio value for said borrower cell in response to said operation b); and d) verifying said adjacent C/I ratio value for said borrower cell exceeds said adjacent C/I ratio threshold.

13. A method as claimed in claim 12 wherein said determining operation further comprises:

identifying a second portion of said plurality of cells that are assigned said second adjacent channel;

computing a second adjacent C/I ratio for said borrower cell in response to said identifying operation; and verifying said second adjacent C/I ratio value for said borrower cell exceeds said adjacent C/I ratio threshold.

14. A method as claimed in claim 12 wherein a first cell and a second cell of said portion of said cells share said adjacent channel, and said method further comprises computing an interference power responsive to a transmission of said adjacent channel from one of said first and second cells.

15. A method as claimed in claim 1 further comprising associating said one of said shared channels with said borrower cell and said donor cell in said channel assignment plan.

16. A method as claimed in claim 15 further comprising indicating in said channel assignment plan that only one of said borrower and said donor cells utilize said one shared channel during a time period.

17. A method as claimed in claim 1 further comprising:

increasing said load factor for said donor cell in response to said designating step, said load factor representing those of said channels of said second subset that are previously designated as said shared channels;

decreasing said deficiency of said quantity of said channels assigned to said borrower cell; and repeating said selecting, choosing, determining, and designating operations in response to identification of a second borrower cell from said plurality of cells.

18. A method as claimed in claim 1 further comprising:

determining when said quality measure for said candidate channel fails to meet said channel sharing constraint;

repeating said choosing and determining operations for subsequent ones of said channels of said second subset; and when one of said subsequent channels meets said channel sharing constraint, designating said one subsequent channel as one of said shared channels.

19. A method as claimed in claim 1 wherein said donor cell is a first donor cell, and said method further comprises:

determining when said candidate channel fails to meet said channel sharing constraint;

repeating said choosing and evaluating operations for subsequent ones of said channels of said second subset;

when all of said subsequent channels violate said channel sharing constraint, selecting a second donor cell from said plurality of cells; and performing said choosing, determining, and designating operations in response to selection of said second donor cell.

20. A system for adapting a channel assignment plan for a cellular communication network to include shared frequency channels, said channel assignment plan distinguishing frequency channels assigned to a plurality of cells, and said system comprising:

an input element for receiving said channel assignment plan;

a memory element in communication with said input element for storing said channel assignment plan;

a borrower cell identifier, in communication with said memory element, for identifying a borrower cell from said plurality of cells in response to said channel assignment plan, said borrower cell identifier including:

a detector for detecting candidate borrower cells from said plurality of cells, each of said candidate borrower cells being assigned subsets of said frequency channels, each of said subsets exhibiting deficiencies in a quantity of said frequency channels assigned to corresponding ones of said candidate borrower cells; and a needier cell selector for specifying a first one of said candidate borrower cells to be said borrower cell, said first borrower cell having a greater deficiency in said quantity of said frequency channels assigned to said needier borrower cell than remaining ones of said candidate borrower cells;

a donor cell selector, in communication with said memory element, for selecting a donor cell from said plurality of cells, said donor cell selector including:

a load factor determiner for ascertaining a load factor for each of said cells from said plurality of cells excluding said identified borrower cell, said load factor representing those of said frequency channels assigned to a corresponding one of said cells that are previously designated as said shared frequency channels; and a better cell selector for specifying a first one of said cells to be said donor cell, said first cell exhibiting said load factor that is less than said load factors for the remaining ones of said cells;

a channel selector for choosing a candidate frequency channel from a subset of said frequency channels assigned to said donor cell;

a channel evaluator for determining a quality measure for said candidate frequency channel; and channel designator for designating said candidate frequency channel as one of said shared frequency channels in said channel assignment plan when quality measure exceeds a channel sharing constraint.

21. A system as claimed in claim 20 further comprising a correlator, in communication with said memory element, for associating said one of said shared frequency channels with said borrower cell and said donor cell in said channel assignment plan.

22. A system as claimed in claim 20 further comprising:

a load adjuster, in communication with said frequency designator, for increasing said load factor for said donor cell in response to the designation of said candidate frequency channel as one of said shared frequency channels; and a deficiency adjuster, in communication with said frequency designator, for decreasing said deficiency in said quantity of said frequency channels assigned to said borrower cell in response to the designation of said candidate frequency channel as one of said shared frequency channels.

23. In a cellular communication network having a channel assignment plan that distinguishes frequency channels assigned to a plurality of cells, a method for adapting said channel assignment plan to include shared frequency channels comprising the steps of:

a) identifying a borrower cell from said plurality of cells, said borrower cell being assigned a first subset of said frequency channels, said first subset having a deficiency in a quantity of said frequency channels assigned to said borrower cell;

b) selecting a donor cell from said plurality of cells in response to a load factor for said donor cell, said donor cell being assigned a second subset of said frequency channels;

c) verifying frequency separations between said candidate frequency channel and each of said frequency channels of said second subset exceed a frequency separation threshold;

d) when each of said frequency separations exceed said frequency separation threshold, verifying a co-channel carrier-to-interference (C/I) ratio value for said borrower cell exceeds a co-channel C/I ratio threshold;

e) when said co-channel C/I ratio value exceeds said co-channel C/I ratio threshold, verifying an adjacent channel C/I ratio value for said borrower cell exceeds an adjacent channel C/I ratio threshold; and f) designating said candidate frequency channel as one of said shared frequency channels in said channel assignment plan in response to said step e).

24. A method as claimed in claim 23 further comprising the step of preventing said candidate frequency channel from being one of said shared frequency channels when said candidate frequency channel violates one of said frequency separation threshold, said co-channel C/I ratio threshold, and said adjacent C/I ratio threshold.

25. A method as claimed in claim 23 further comprising the step of repeating said operations c)–f) for subsequent ones of said frequency channels of said second subset when said candidate frequency channel violates one of said frequency separation threshold, said co-channel C/I ratio threshold, and said adjacent C/I ratio threshold.

* * * * *